(12) United States Patent
Wingender et al.

(10) Patent No.: US 10,946,845 B2
(45) Date of Patent: Mar. 16, 2021

(54) ELECTROMECHANICAL BRAKE BOOSTER

(71) Applicant: Lucas Automotive GmbH, Koblenz (DE)

(72) Inventors: Kurt Wingender, Hartenfels (DE); Martin Hofmann, Mendig (DE); Boris Koeth, Weitersburg (DE); Jose Manuel Calvo Martinez, Kruft (DE); Jens Sparfeld, Miehlen (DE)

(73) Assignee: ZF Active Safety GmbH, Koblenz (DE)

( * ) Notice: Subject to any disclaimer, the term of this patent is extended or adjusted under 35 U.S.C. 154(b) by 50 days.

(21) Appl. No.: 15/761,093

(22) PCT Filed: Sep. 16, 2016

(86) PCT No.: PCT/EP2016/072056
§ 371 (c)(1),
(2) Date: Mar. 17, 2018

(87) PCT Pub. No.: WO2017/046383
PCT Pub. Date: Mar. 23, 2017

(65) Prior Publication Data
US 2018/0257618 A1    Sep. 13, 2018

(30) Foreign Application Priority Data
Sep. 17, 2015   (DE) .................... 10 2015 012 124.3

(51) Int. Cl.
*B60T 13/74*    (2006.01)
*B60T 8/48*     (2006.01)
(Continued)

(52) U.S. Cl.
CPC .......... *B60T 8/4854* (2013.01); *B60T 13/745* (2013.01); *B60T 13/746* (2013.01); *F16H 1/225* (2013.01); *F16H 19/04* (2013.01); *B60T 13/741* (2013.01)

(58) Field of Classification Search
CPC ........ B60T 13/745; F16H 1/222; F16H 19/04; F16D 2125/24; F16D 2125/48
See application file for complete search history.

(56) References Cited

U.S. PATENT DOCUMENTS

| | | | |
|---|---|---|---|
| 5,875,681 | A | 3/1999 | Gerrand et al. |
| 7,581,714 | B2 | 9/2009 | Machu |
| (Continued) | | | |

FOREIGN PATENT DOCUMENTS

| | | |
|---|---|---|
| DE | 10009390 A1 | 9/2001 |
| DE | 102009001142 A1 | 8/2010 |
| (Continued) | | |

OTHER PUBLICATIONS

PCT International Search Report and the Written Opinion, Application No. PCT/EP2016/072056 filed Sep. 16, 2016, dated Nov. 15, 2016.

(Continued)

*Primary Examiner* — Bradley T King
(74) *Attorney, Agent, or Firm* — Robert James Harwood

(57) ABSTRACT

The disclosed electromechanical brake booster for a vehicle brake system comprises a driving arrangement for driving at least one actuation device designed to actuate a brake cylinder. The driving arrangement includes at least one electric motor and a gear mechanism for coupling the electric motor to the at least one actuation device. The gear mechanism comprises at least one first spur gear and at least (Continued)

one second spur gear, the electric motor driving the first spur gear directly and the second gear via at least one intermediate gear.

1 Claim, 16 Drawing Sheets

(51) Int. Cl.
*F16H 19/04* (2006.01)
*F16H 1/22* (2006.01)

(56) References Cited

U.S. PATENT DOCUMENTS

| | | | |
|---|---|---|---|
| 8,997,482 B2 | 4/2015 | Richard et al. | |
| 9,139,186 B2 | 9/2015 | Vollert et al. | |
| 9,476,470 B2* | 10/2016 | Park | F16D 55/225 |
| 9,650,028 B2 | 5/2017 | Cagnac | |
| 9,776,604 B2* | 10/2017 | Lee | B60T 1/10 |
| 2008/0289922 A1* | 11/2008 | Hofmann | F16D 51/20 188/325 |
| 2014/0208894 A1 | 7/2014 | Miller | |
| 2015/0129371 A1* | 5/2015 | Gutelius | F16D 65/18 188/72.6 |
| 2015/0197231 A1 | 7/2015 | Winkler et al. | |
| 2015/0308527 A1 | 10/2015 | Nagel et al. | |
| 2018/0141531 A1* | 5/2018 | Brok | B60T 13/745 |
| 2018/0257619 A1* | 9/2018 | Wingender | B60T 13/745 |
| 2018/0273011 A1* | 9/2018 | Wingender | B60T 13/745 |
| 2019/0047532 A1* | 2/2019 | Ohm | B60T 13/745 |

FOREIGN PATENT DOCUMENTS

| | | |
|---|---|---|
| DE | 102011080979 A1 | 1/2013 |
| DE | 102012014361 A1 | 1/2014 |
| DE | 102013007574 A1 | 11/2014 |
| DE | 102013217745 A1 | 3/2015 |
| EP | 0792779 A1 | 8/1997 |
| EP | 2292483 A1 | 3/2011 |
| EP | 2420421 A1 | 2/2012 |
| EP | 2465741 A1 | 6/2012 |
| EP | 2781779 A1 | 9/2014 |
| WO | 2006/079759 A1 | 8/2006 |
| WO | 2011/003643 A1 | 1/2011 |
| WO | 2011/026804 A1 | 3/2011 |
| WO | 2014/012702 A1 | 1/2014 |
| WO | 2014/090468 A1 | 6/2014 |
| WO | 2014/177691 A1 | 11/2014 |

OTHER PUBLICATIONS

PCT International Preliminary Report on Patentability, Application No. PCT/EP2016/072056 filed Sep. 16, 2016, dated Oct. 27, 2017.

\* cited by examiner

ELECTROMECHANICAL BRAKE BOOSTER

CROSS-REFERENCE TO RELATED APPLICATIONS

This application is the National Phase of International Application PCT/EP2016/072056 filed Sep. 16, 2016 which designated the U.S. and that International Application was published in English under PCT Article 21(2) on Mar. 23, 2017 as International Publication Number WO 2017/046383 A1. PCT/EP2016/072056 claims priority to German Application No. 10 2015 012 124.3, filed Sep. 17, 2015. Thus, the subject nonprovisional application claims priority to DE 10 2015 012 124.3, filed Sep. 17, 2015. The disclosures of both applications are incorporated herein by reference.

BACKGROUND OF THE INVENTION

The present disclosure relates generally to the technical field of electrohydraulic braking force generating devices. In particular, it relates to an electromechanical brake booster which may be used in an electrohydraulic braking force generating device.

Electromechanical brake boosters are powered by electric motors. In order to be able to amplify braking force with the brake booster, the rotational motion of the output shaft of the electric motor must be converted into a translational motion. Various devices for this purpose are known from the prior art.

WO 2014/177691 discloses a braking system with a master brake cylinder and a servobrake. The servobrake is equipped with an electric motor, the output shaft of which supports a screw. The screw drives two worm gears. The worm gears are each connected to a spur gear via a shaft. The spur gears each drive a toothed rack with which they are able to shift a thrust rod to actuate the master brake cylinder.

In document WO 2011/003643 A1 a power transmission assembly is disclosed. The power transmission assembly comprises an electric motor which drives a worm shaft. A worm wheel is formed on the worm shaft. The power transmission assembly further comprises a first worm wheel, a second worm wheel, a first pinion and a second pinion. A toothed rack has a first row of teeth and a second row of teeth. The longitudinal axis of the toothed rack extends parallel to the axis of the worm shaft. The first pinion meshes with the first row of teeth and the second pinion meshes with the second row of teeth. The first pinion is connected to the first worm wheel, so that the first worm wheel and the first pinion rotate together. Similarly, the second worm wheel is connected to the second pinion. The first worm wheel and the second worm wheel are driven jointly by the worm gearing on the worm shaft.

An electromechanical brake booster disclosed in the document EP 2 420 421 A1 is also known from the prior art. The electromechanical brake booster includes an electric motor, a thrust rod and a drive means for driving the thrust rod. A drive shaft of the electric motor drives a first gear with external toothing and a second gear with an internal toothing. The first gear drives a first gearwheel and the second gear drives a second gearwheel. The first gearwheel and the second gearwheel engage with a toothing on the thrust rod to drive the thrust rod translationally.

The devices known from the prior art are relatively large because of their design and construction. One of the reasons for this is the complex structure of the gearing arrangements described in the abovementioned documents for converting rotary motion into translational motion.

SUMMARY OF THE INVENTION

An electromechanical brake booster with compact design and correspondingly reduced installation space requirements will be described.

The electromechanical brake booster for a vehicle brake system comprises a drive arrangement for driving at least one actuator designed to actuate a brake cylinder. The drive assembly has at least one electric motor and a gear mechanism for coupling the electric motor to the at least one actuator. The gear mechanism comprises at least one first spur gear and at least one second spur gear, wherein the electric motor drives the first spur gear directly and the second spur gear via at least one intermediate gear. A spur gear is understood to be a gearwheel with toothing on its outer circumference. By using spur gears, it is possible to provide a compact, space-saving gear mechanism directly in line with the direction of the axis of rotation of the electric motor. The compact construction of the gear mechanism results in a drive assembly of an electromechanical brake booster which occupies little installation space in a vehicle.

The intermediate gear may also have the form of a spur gear, that is to say an intermediate gear may have external toothing. The intermediate gear makes it possible to reverse the direction of rotation of the second spur gear relative to the direction of rotation of the first spur gear. The first spur gear and the second spur gear thus rotate in opposite directions. The gear mechanism is configured so that the rotary motion of the output shaft of the electric motor is converted into a translational motion of the actuator. This is achieved among other things by the fact that the spur gears are driven in opposite directions of rotation. The translational motion of the actuator enables the brake cylinder to be actuated to generate a braking force.

In order to be able to construct the gear mechanism to occupy as little space as possible in the direction of the axis of rotation of the electric motor, the first spur gear, the intermediate gear and the second spur gear may be arranged in the same plane in the direction of the axis of rotation of the electric motor.

The at least one actuator may include at least one toothed rack section. The at least one toothed rack section may be provided on the second actuating element, because the second actuating element is to be driven mainly by the gear mechanism. A first toothed rack section and a second toothed rack section may be provided on the at least one actuator, and may be coupled to the gear mechanism.

One of the spur gears may be coupled to the at least one toothed rack section. In such case, the first toothed rack section may be coupled to the first spur gear, and the second toothed rack section may be coupled to the second spur gear. Each spur gear may be coupled to one of the toothed rack sections via a shaft and a gearwheel disposed thereon. The two toothed rack sections may be provided on opposite sides of the actuator.

The units of the drive assembly such as the gear mechanism and the electric motor may be arranged on different sides of the actuator depending on the space available in the vehicle. For example, the electric motor may be arranged on one side of the actuator and the gear mechanism may be arranged on the side of the actuator facing away from the side with the electric motor. Depending on the arrangement of the motor and the gear mechanism, the gear mechanism may be constructed with spur gears and an intermediate gear which do not lie in the same plane. Accordingly, the first spur gear and the intermediate gear may be offset with respect to each other in the direction of the axis of rotation of the electric motor. Even so, the second spur gear and the intermediate gear may be located in the same plane in the direction of the axis of rotation of the electric motor.

A pinion may be provided on the output shaft of the electric motor to drive the first spur gear and the intermediate gear. The pinion may be positioned in the same plane as the first spur gear and the intermediate gear in the direction of the axis of rotation of the electric motor in one plane. In this way, a particularly space-saving design can be achieved because the transmission output shaft of the electric motor can be relatively short. The pinion on the output shaft of the electric motor may have substantially the same extension as the first spur gear and the intermediate gear in the direction of the axis of rotation of the electric motor.

If the first spur gear and the intermediate gear are to be arranged with an offset relative to each other in the direction of the axis of rotation of the electric motor, the motor output shaft must be dimensioned accordingly. The motor output shaft may be provided with a corresponding pinion. The pinion may be designed to drive the first spur gear and the intermediate gear which is offset relative to the first spur gear in the direction of the axis of rotation of the electric motor. The extension of the at least one pinion or the extension of the toothing on the pinion may span at least the axial extension of the external circumferential surfaces of the first spur gear and of the intermediate gear in the direction of the axis of rotation of the electric motor.

At least the first spur gear, the second spur gear and the intermediate gear may have helical gearing. Further, the pinion or the pinion on the motor output shaft may have helical gearing. Due to the helical gearing, relatively few teeth are needed for transmitting torque between the gears. This is particularly true for the pinion that is driven by the motor for the pinion that is driven by the motor. With such a pinion and gear wheel with a low number of teeth, a relatively high reduction ratio can be achieved. Moreover, because of the low number of teeth the gears with helical toothing may be made relatively small, resulting in a compact construction of the gear mechanism. Smaller gearwheels also allow a small distance between the axes of the individual gearwheels, which also enables compact construction of the gear mechanism. Helical gearing arrangements with a relatively large helix angle are also called evoloid toothing.

The first spur gear and the second spur gear may each be connected to a shaft provided with a gearwheel. The gearwheels on the shafts driven by the first spur gear and the second spur gear may each engage in at least one toothed rack section. The at least one toothed rack section may be provided on the at least one actuator. The rotational motion of the spur gears and of the gearwheels connected to the spur gears by shafts is converted into a translational movement via the toothed rack section, which rotary motion is able to displace the actuator towards the brake cylinder or away from the brake cylinder. A first toothed rack section and a second toothed rack section may be provided on the at least one actuator. The first toothed rack section may cooperate with the first spur gear and the second toothed rack section may cooperate with the second spur gear.

The drive assembly may comprise a control unit which is designed to control the at least one electric motor. The at least one control unit may include a sensor assembly or may be connected to a sensor assembly. The sensor assembly may for example be designed to make it possible to determine the necessary boost for the force applied to the brake pedal. Based on the measurement values of the sensor assembly, a determination may then be made of the boosting force that needs to be provided particularly by the electric motor via the gear mechanism. The measurement values detected by the sensor assembly thus deliver an indicator of the boosting force which must be generated by the electric motor together with the gear mechanism and transmitted to the at least one actuator. Individual sensors of the sensor assembly may be integrated in the electric motor and/or the control unit. The boosting force to be provided by the electromechanical brake booster may depend on a braking intention by the driver or commands from a vehicle dynamics control program detected by the sensor assembly. The braking intention may be detected for example by the at least one sensor assembly and converted into corresponding drive signals for the electric motor by the at least one control unit. The braking intention may be determined, for example, by detecting a brake pedal travel and/or a brake pedal actuating force acting on the brake pedal. One or more vehicle dynamics control programs, such as an antilock braking system (ABS), automatic traction control (ATC) and electronic stability program (ESP), may be stored in the control unit.

The drive assembly may be disposed in a vehicle in the assembled state in such a manner that the axis of rotation of the electric motor is perpendicular to the longitudinal axis of the actuator and at a predetermined angle to the vertical axis of the vehicle. The electric motor may be arranged as close as possible to the actuator it drives, thereby achieving a compact, space-saving structure of the electromechanical brake booster. The positioning of the drive assembly of the electromechanical brake booster at a predetermined angle to the vertical axis of the vehicle allows improved utilization of the installation space available in the vehicle, which is determined by the fastening points existing or designated in the vehicle. The drive assembly may be aligned and arranged such that the installation space available in a vehicle may be utilized most efficiently in respect of the designated fastening points. The axis of rotation of the electric motor may extend in any conceivable angle relative to the vertical axis of the vehicle. The axis of rotation of the electric motor may for example also extend at an angle of 0° relative to the vertical axis of the vehicle and thus parallel to the vertical axis. The axis of rotation of the electric motor may also extend at an angle of 45 degrees or 135 degrees to the vertical axis of the vehicle, to mention other examples.

The actuator may comprise at least one first actuating element, which may be acted upon by a brake pedal force exerted on a brake pedal. Besides the first actuating element, the actuator may comprise at least a second actuating element, which is driven by the electric motor via the gear mechanism. The at least one first actuating element may be at least partially accommodated in the second actuating element. The first actuating element and the second actuating element may cooperate to transmit a braking force to the brake cylinder. In this case it may be provided that at least a part of the braking force exerted on the first actuating element by the brake pedal is transmitted directly to the brake cylinder. The electric motor may be controlled by the control unit on the basis of the detected braking force requested by the driver via the brake pedal. The electric motor may shift the second actuating element towards the brake cylinder via the gear mechanism to generate a boosting force. The first actuating element and the second actuating element are shifted towards the brake cylinder to generate a braking pressure on the wheel brakes via the brake cylinder.

Fastening points are provided on the vehicle for the mounting of a brake booster together with a brake cylinder. These fastening points are usually designated by the vehicle manufacturers. The electromechanical brake booster may comprise at least one fastening device that may be attached to the fastening points provided in the vehicle. The fastening may for example have a flange with apertures and mounting bolts which are received in the apertures on the flange. The brake booster may be mounted together with a brake cylinder on the vehicle on the vehicle by means of the mounting bolts. The brake cylinder and the electromechanical brake booster may form one assembly. The fastening means defines a fastening plane. The axis of rotation of the electric motor may extend at an angle of 60 to 120° with respect to the fastening plane.

A further aspect is an electrohydraulic motor vehicle braking system with an electromechanical brake booster of the type described above.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It should be noted that in the figures described below, the toothing arrangements of the individual gearwheels, toothed racks, etc., are shown only schematically. It is understood that a suitable toothing is present in each case, which may also be embodied for example as helical gear toothing to enable the gear mechanism elements to mesh with each other.

Figure 1:
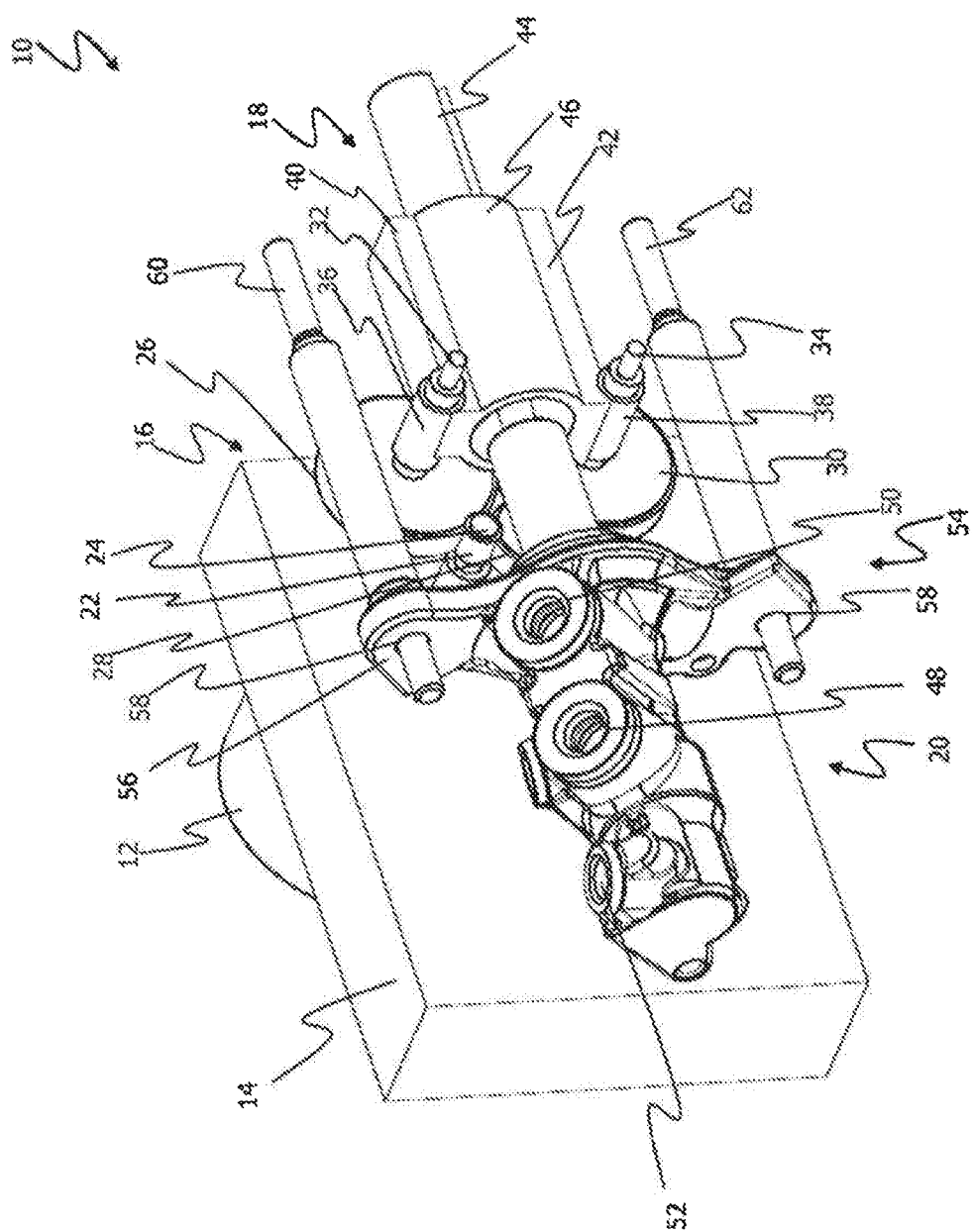
FIG. 1 is a perspective view of an electromechanical brake booster according to one embodiment.

FIG. 1 shows a perspective view of an electromechanical brake booster, which is generally designated 10.

Electromechanical brake booster 10 comprises a motor 12, a control unit 14, a gear mechanism 16 and an actuator 18. Actuator 18 is coupled to a brake cylinder 20. Electromechanical brake booster 10 and braking cylinder 20 form one assembly.

A pinion 24 is provided on an output shaft 22 of electric motor 12. Pinion 24 drives a first spur gear 26 and an intermediate gear 28 directly, without interposed components. A second spur gear 30 is driven via intermediate gear 28. Spur gears 26 and 30 each drive a shaft 32, 34. A gear wheel or toothed roller 36, 38 is provided on each of the shafts 32 and 34. Gear wheels 36 and 38 each engage with a toothed rack section 40, 42 on actuator 18. The toothed rack sections 40, 42 are disposed on opposite sides of the actuator 18. The respective toothing arrangements of these elements 24, 26, 28, 30, 36, 38, 40, 42 are only shown schematically.

Actuator 18 includes a first actuating element 44 and a second actuating element 46. Toothed rack sections 40, 42 are provided on the second actuating element 46, and engage with gear wheel 36, 38. The first actuating element 44 may be acted upon by a braking force exerted on a brake pedal by a driver of the vehicle. This causes the first actuating element 44 to be moved towards brake cylinder 20. The boost force requested by the driver is generated by actuator 18, which is driven by electric motor 12 via gear mechanism 16.

For this purpose, second actuating element 46 is moved towards brake cylinder 20, by electric motor 20 via the gear mechanism 16 and in particular via gear wheels 36, 38 and toothed rack sections 40, 42 to deliver the driver's requested boost force additionally to braking cylinder 20. The motion of actuator 18 with its actuating elements 44, 46 towards brake cylinder 20 has the effect of generating a hydraulic pressure in brake cylinder 20 that corresponds to the braking pressure requested by the driver. Brake cylinder 20 has two openings 48, 50 through which the braking circuits of the vehicle may be charged with hydraulic fluid and thus exposed to hydraulic pressure to generate a braking force at the wheel brakes. A reservoir for brake fluid or a pressure compensation tank may be disposed on the further opening 52 of brake cylinder 20.

A fastening means 54 with a flange 56 and openings 58 is provided in a region between the brake cylinder 20 and the actuator 18. Openings 58 are conformed to accommodate mounting bolts 60, 62. Mounting bolts 60, 62 may be inserted and secured in holes in a predetermined mounting position on the vehicle, for example on a bulkhead (not shown). The location of mounting holes 60, 62 is usually designated by the vehicle manufacturers.

Figure 2:
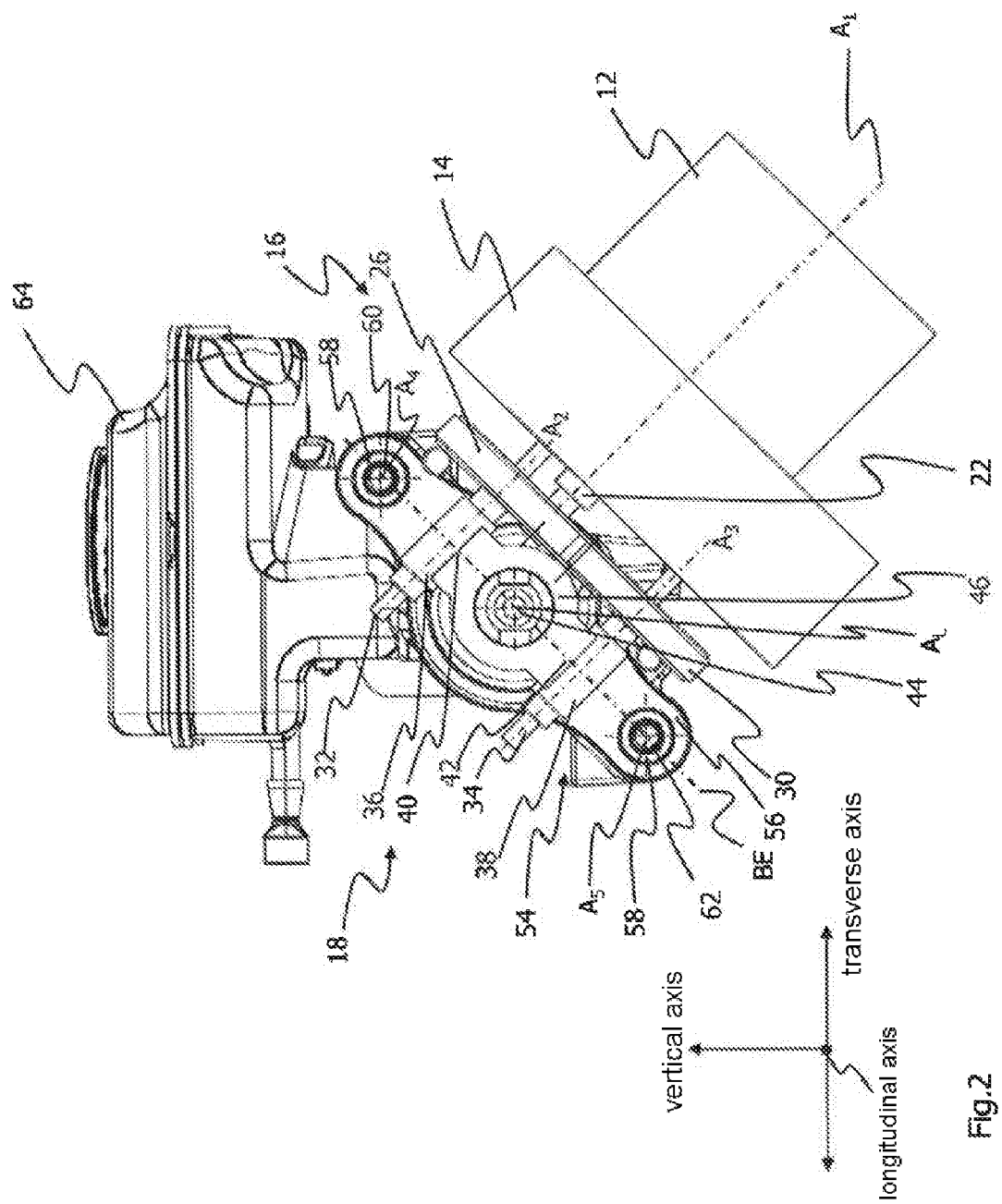
FIG. 2 is a perspective view of the electromechanical brake booster with an alternative arrangement of the gear mechanism, electric motor and control unit.

FIG. 2 shows a front view of the electromechanical brake booster 10 shown in FIG. 1.

In FIG. 2 the vertical axis, the longitudinal axis and the transverse axis of the vehicle are indicated. The vertical axis of the vehicle is an axis which extends substantially in the vertical direction. The longitudinal axis $A_L$ of actuator 18 extends parallel to the longitudinal axis of the vehicle.

Control unit 14 is arranged between motor 12 and gear mechanism 16. Electric motor 12 drives gear mechanism 16, via which the two gear wheels 36 and 38 are driven to shift actuator 18 in the direction of longitudinal axis $A_L$ via toothed rack sections 40, 42. The displacement of actuator 18 along longitudinal axis $A_L$ causes the actuation of brake cylinder 20, of which only a brake fluid reservoir 64 is visible in FIG. 2.

The drive assembly consisting of motor 12, control unit 14 and gear mechanism 16 is arranged at a predetermined angle relative to the vertical axis of the vehicle. The angle is dictated by the axis of rotation $A_1$ of electric motor 12, which extends at a predetermined angle to the vertical axis of the vehicle. This angle may be 45°. Similarly to the axis of rotation $A_1$ of electric motor 14, the axes of rotation $A_2$ and $A_3$ of the spur gears 26, 30, the shafts 32, 34 and the gear wheels 36 and 38 extend at a predetermined angle relative to the vertical axis of the vehicle.

Electromechanical brake booster 10 is equipped with a fastening device 54. Fastening device 54 comprises a flange 56 having openings 58 and mounting bolts 60, 62. The mounting bolts 60, 62 are fixedly connected to the assembly and flange 56 on brake cylinder 20. Mounting bolts 60, 62 span a fastening plane BE. Fastening plane BE extends through center axes $A_4$ and $A_5$ of mounting bolts 60, 62. Fastening plane BE runs obliquely, at a predetermined angle to the vertical axis of the vehicle. The longitudinal axis $A_L$ of actuator 18 is located in fastening plane BE. The axis of rotation $A_1$ of electric motor 12 extends perpendicularly to the longitudinal axis $A_L$ of actuator 18 and brake cylinder 20. The axis of rotation $A_1$ of electric motor 12 extends perpendicularly to the fastening plane BE. The same applies to the axes of rotation $A_2$ and $A_3$ of spur gears 26, 30 and the components connected to the spur gears 26, 30. Axis of rotation $A_1$ does not have to extend perpendicularly to the fastening plane, but may also extend at an angle of 60 to 120° to the fastening plane.

In the embodiment of the electromechanical brake booster 10 shown in FIG. 2, the electric motor 12, the control unit 14 and the gear mechanism 16 are arranged together on one side of actuator 18 and fastening plane BE. This makes it possible to create a particularly compact construction of the drive assembly for brake booster 10.

FIGS. 3 to 7 show further embodiments of electromechanical brake booster 10, which differ essentially in the arrangement of the motor 12, the control unit 14 and the gear mechanism 16. The drive assembly is arranged at the angle relative to the vertical axis of the vehicle predetermined by the axis of rotation $A_1$ of electric motor 12 irrespective of the arrangement of the drive assembly with the electric motor 12, the control unit 14 and the gear mechanism 16 on actuator 18. The axis of rotation $A_1$ of electric motor 12 also extends perpendicularly to fastening plane BE and also perpendicularly to the longitudinal axis $A_L$ of actuator 18 in all embodiments.

Figure 3:
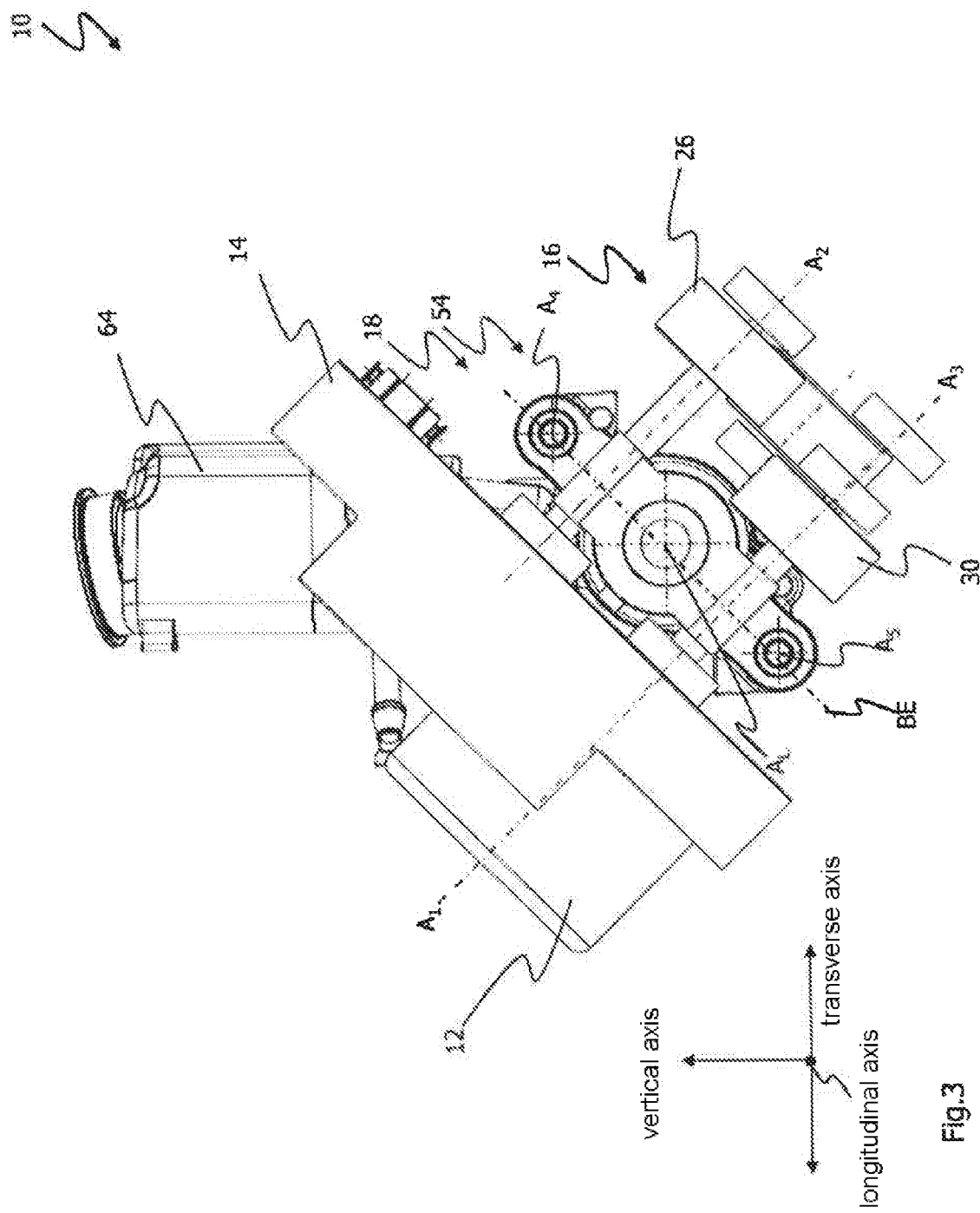
FIG. 3 is a perspective view of the electromechanical brake booster with an alternative arrangement of the gear mechanism, electric motor and control unit.

FIG. 3 shows a front view of a further embodiment of the electromechanical brake booster 10, in which the electric motor 12 and the control unit 14 are disposed together on one side of the actuator 18 and the gear mechanism 14 is disposed on the other side of actuator 18. Also in this embodiment, axis of rotation $A_1$ of electric motor 12 extends obliquely to the vertical axis of the vehicle and perpendicularly to fastening plane BE. Axes of rotation $A_2$ and $A_3$ of spur gears 26 and 30 extend obliquely, at a predetermined angle to the vertical axis of the vehicle but also perpendicularly to the fastening plane BE. The axis of rotation $A_1$ of the electric motor extends perpendicularly to the longitudinal axis $A_L$ of actuator 18.

Gearbox 16 according to this embodiment differs structurally from the gear mechanism 16 described above. This variant of gear mechanism 16 will be discussed in detail later in this description with reference to FIGS. 12 to 16. Actuator 18 corresponds to the actuator described in detail with reference to FIGS. 1 and 2. However, is should be noted here that motor output shaft 22 extends from the side of the actuator 18 on which motor 12 is disposed to the other side with the gear mechanism 16, to be able to transmit a torque generated by the motor 12 to the gear mechanism 16.

Figure 4:
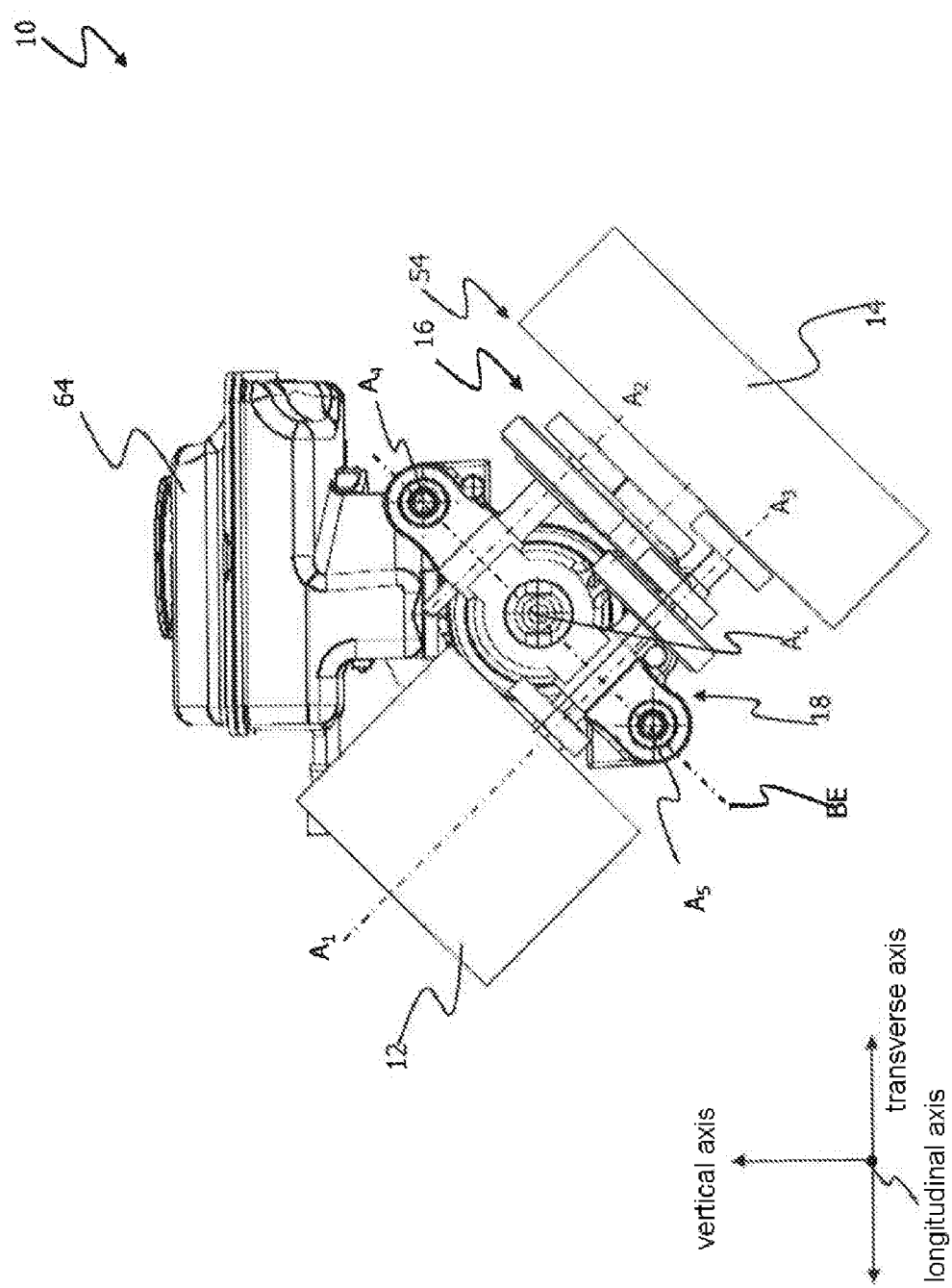
FIG. 4 is a perspective view of the electromechanical brake booster with an alternative arrangement of the gear mechanism, electric motor and control unit.

FIG. 4 shows a front view of a further embodiment of brake booster 10.

In this embodiment, electric motor 12 is disposed on one side of actuator 18 and on one side of mounting plane BE. Gearbox 16 is arranged together with control unit 14 on the side of actuator 18 facing away from motor 12 and on the respective other side mounting plane BE. The axes of rotation $A_1$, $A_2$ and $A_3$ extend obliquely, at a predetermined angle to the vertical axis of the vehicle and perpendicularly to the mounting plane BE. Axis of rotation $A_1$ of the electric motor extends perpendicularly to the longitudinal axis $A_L$ of actuator 18.

Figure 5:
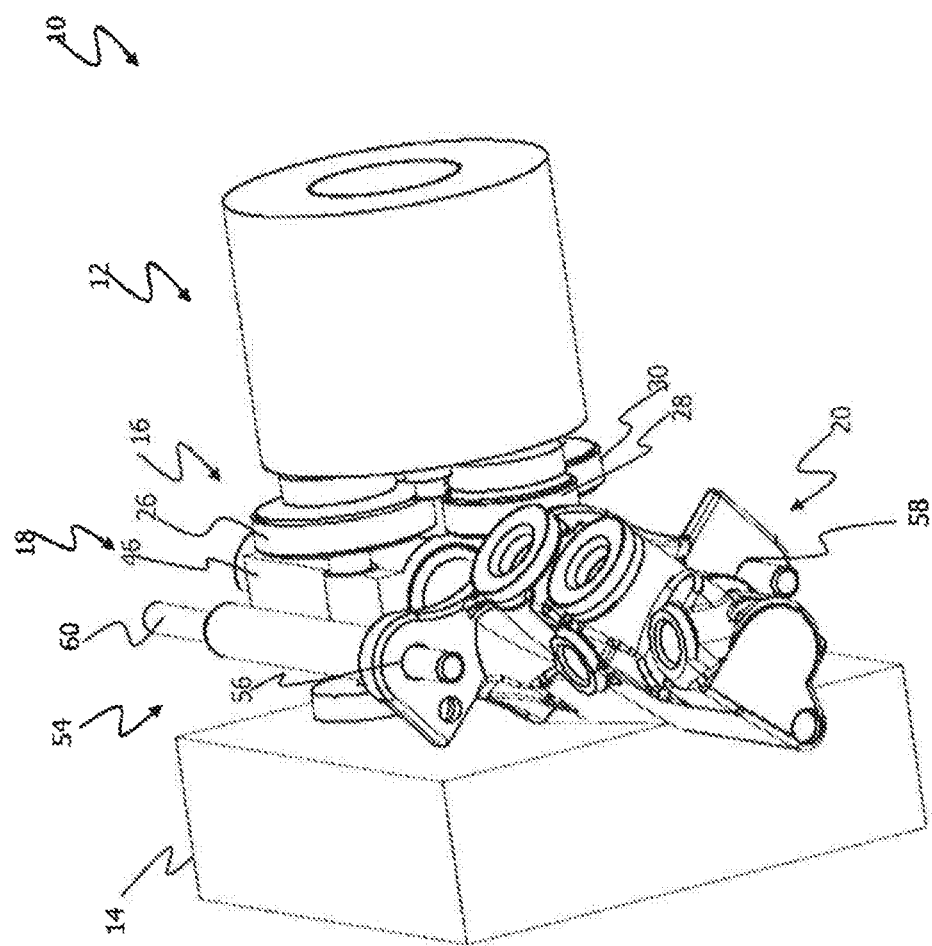
FIG. 5 is a perspective view of the electromechanical brake booster with an alternative arrangement of the gear mechanism, electric motor and control unit.

FIG. 5 shows a perspective view of a further embodiment of the brake booster 10.

In this embodiment of brake booster 10, motor 12 together with gear mechanism 16 is provided on the side of actuator 18 and brake cylinder 20. Control unit 14 is also provided on the side of actuator 18 and brake cylinder 20 facing away from gear mechanism 16. In this embodiment as well, motor output shaft 22 extends from the side of the motor 12 to the side with gear mechanism 16. Motor output shaft 22 passes through mounting plane BE.

Figure 6:
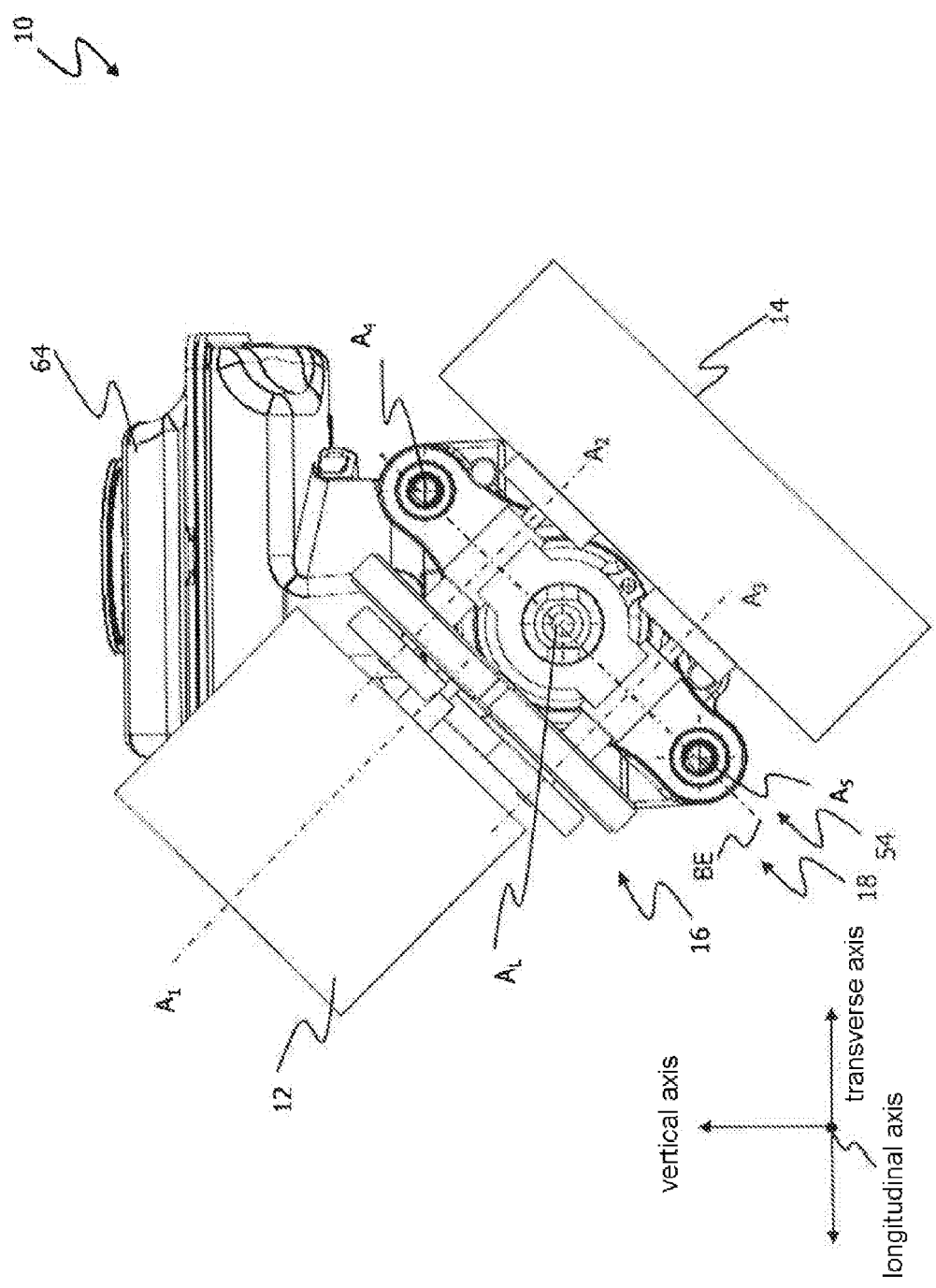
FIG. 6 is a perspective view of the electromechanical brake booster with an alternative arrangement of the gear mechanism, electric motor and control unit.

FIG. 6 shows a front view of the electromechanical brake booster 10 of FIG. 5.

Electric motor 12 and gear mechanism 16 are disposed on one side of actuator 18 and mounting plane BE. Control unit 14 is arranged on the respective other side of actuator 18 and mounting plane BE. The axes of rotation $A_1$, $A_2$ and $A_3$ are oblique to the vertical axis of the vehicle, but perpendicular to the mounting plane BE.

Figure 7:
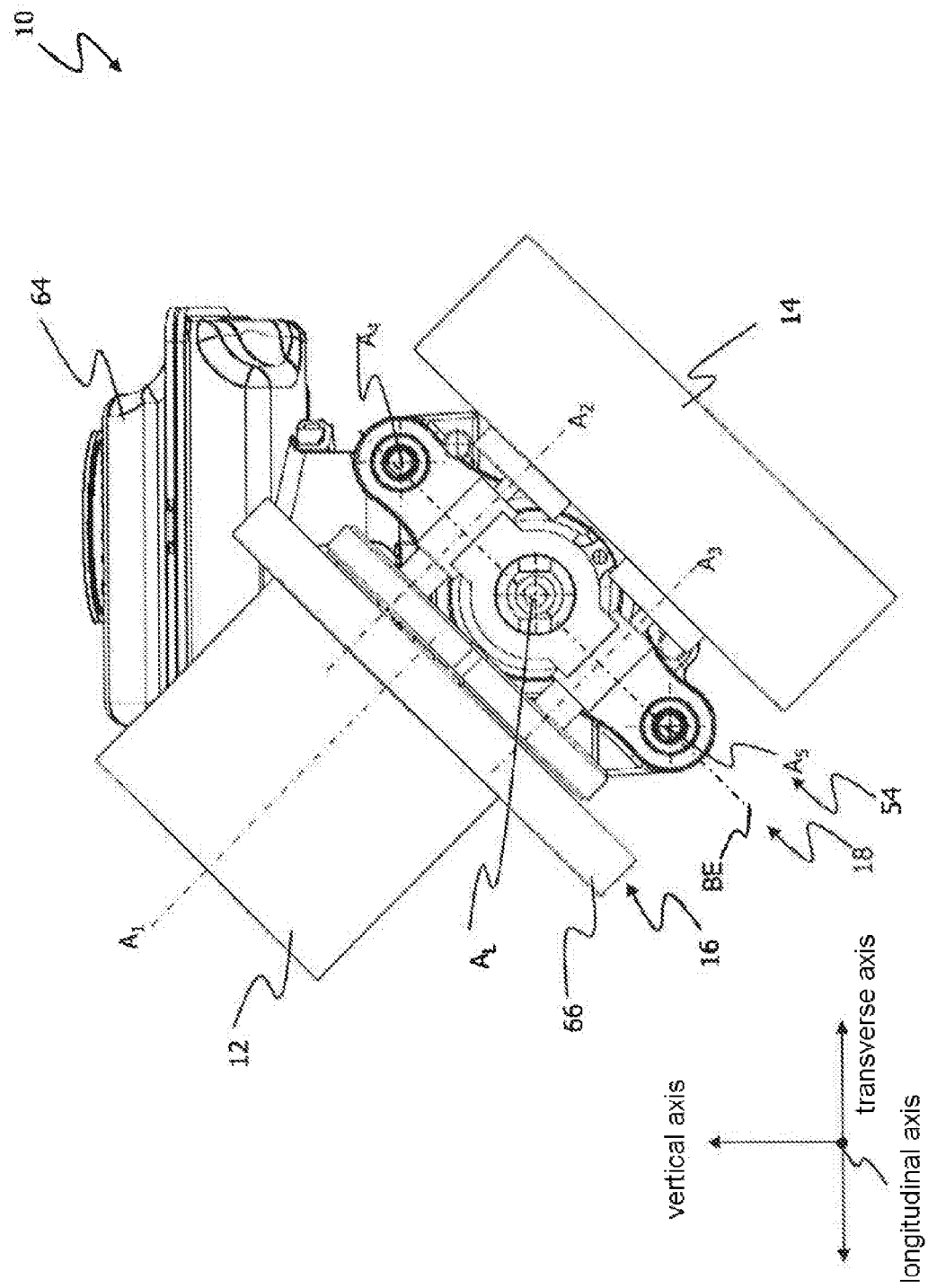
FIG. 7 is a perspective view of the electromechanical brake booster with an alternative arrangement of the gear mechanism, electric motor and control unit.

The view according to FIG. 7 largely corresponds to the view according to FIG. 6. Parts of gear mechanism 16 and of motor output shaft 22 are obscured by a gear mechanism housing 66 for absorbing bearing loads of the axes of rotation $A_2$ $A_3$, $A_6$ and rotating shafts.

Figure 8:
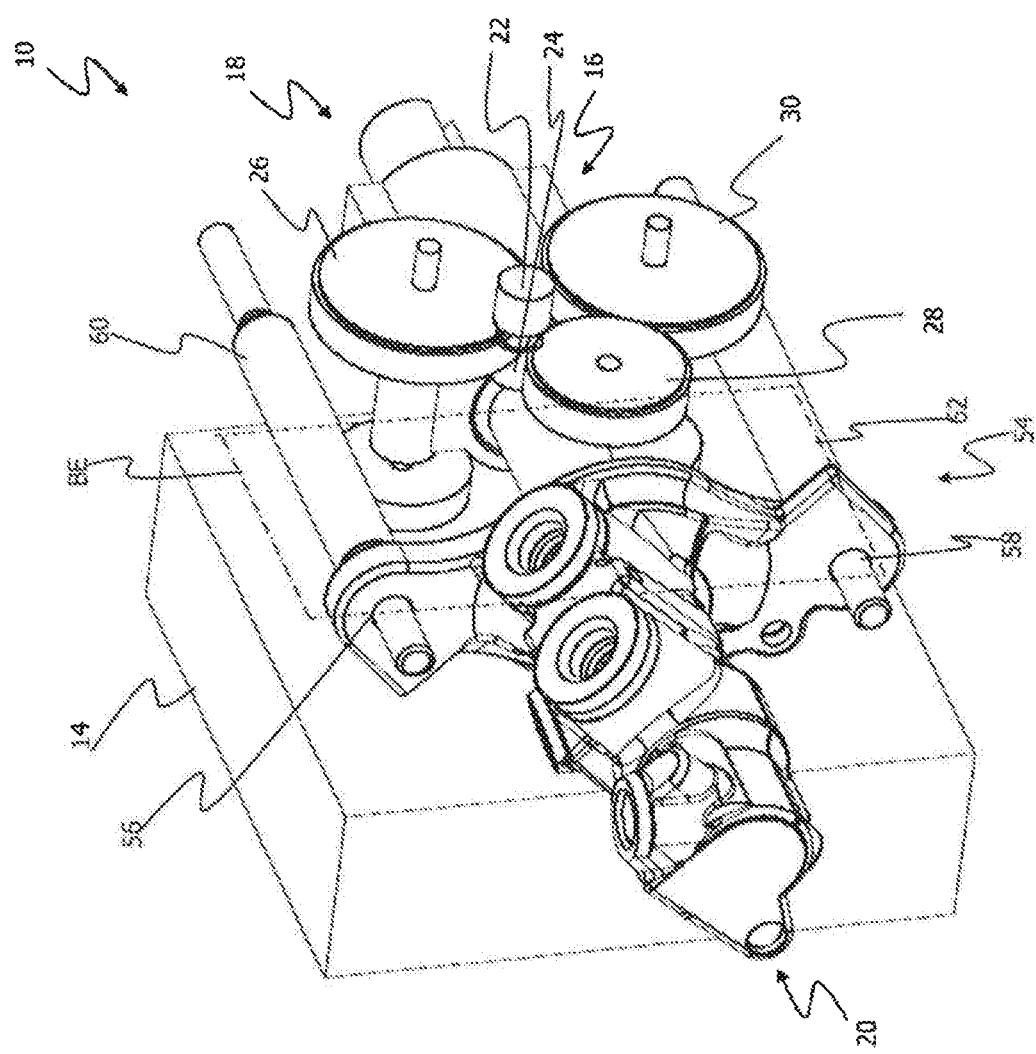
FIG. 8 is a perspective view of an electromechanical brake booster with a gear mechanism according to a first design variant.

FIG. 8 shows a perspective view of electromechanical brake booster 10 with a gear mechanism 16 according to a first design variant. Gearbox 16 has a first spur gear 26 and a second spur gear 30. The first spur gear 26 is driven directly by the motor shaft 22 via a pinion 24, outlined only schematically in FIG. 8, which is arranged on motor output shaft 22. An intermediate gear 28 is also driven directly by pinion 24. Intermediate gear 28 in turn drives the second spur gear 30. Intermediate gear 28 makes it possible to reverse the direction of rotation of second spur gear 30 compared with the rotational direction of first spur gear 26, so that the spur gears 26 and 30 rotate in opposite directions. The opposite directions of rotation of the first spur gear and the second spur gear are needed to enable actuator 18 to drive both spur gears 26 and 30.

First spur gear 26, intermediate gear 28, second spur gear 30 and pinion 24 on motor output shaft 22 are arranged in the same plane in the direction of the axis of rotation $A_1$ of electric motor 12.

Figure 9:
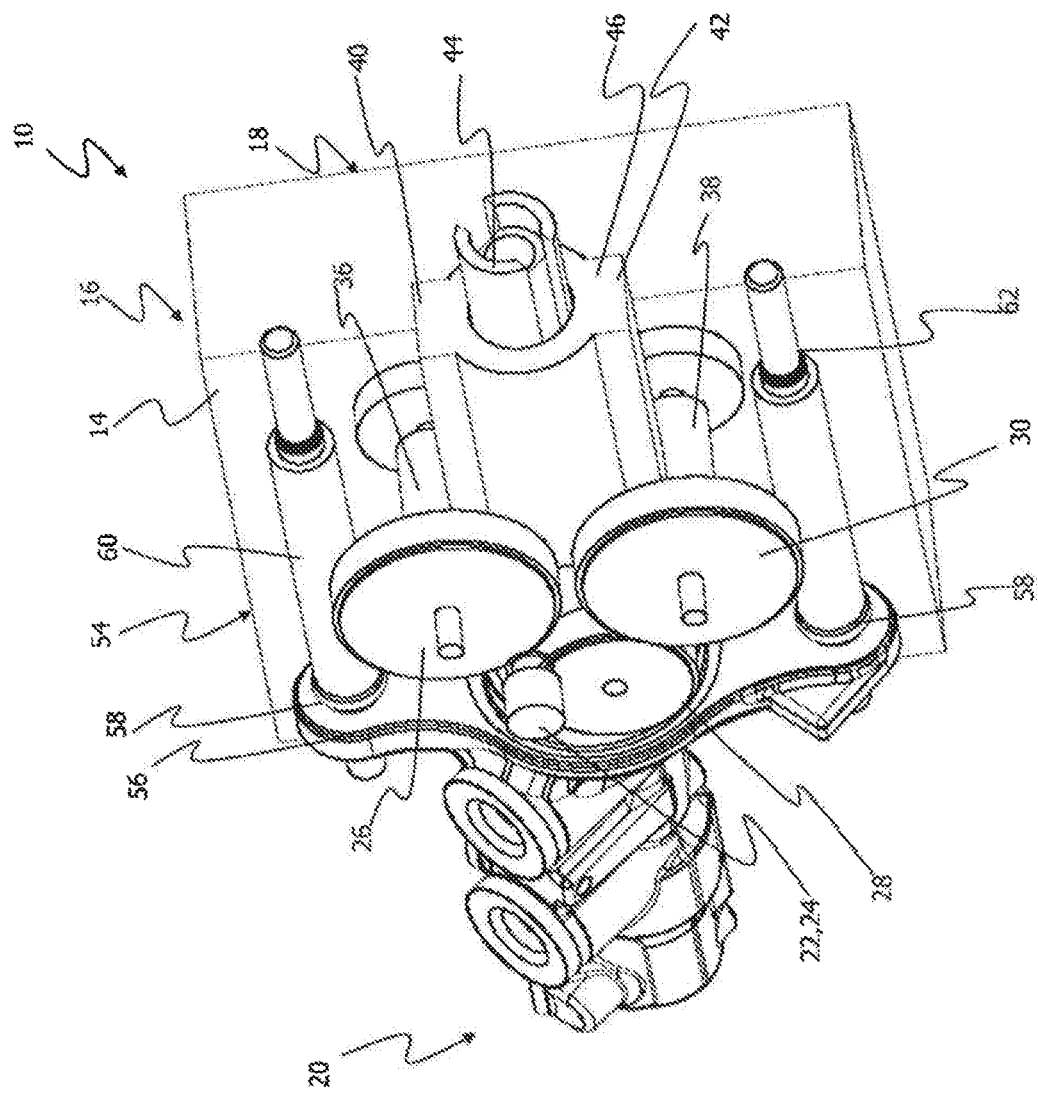
FIG. 9 is a perspective view of an electromechanical brake booster with a gear mechanism according to the first design variant.

FIG. 9 shows a further perspective view of the brake booster 10 shown in FIG. 8.

Actuator 18 consists of a first actuating element 44 and a second actuating element 46. The second actuating element 46 may be driven by gear mechanism 16. For this purpose, the second actuating element 46 is equipped with toothed rack sections 40 and 42 in which gear wheels 36 and 38 engage. Gear wheels 36 and 38 are connected to the first spur gear 26 and the second spur gear 30 and are driven by the spur gears 26, 30. The first spur gear 26 is driven directly by the pinion 24 on motor output shaft 22. Pinion 24 on motor output shaft 22 drives intermediate gear 28, which in turn drives the second spur gear 30. When a braking force exerted by the driver on a brake pedal (not shown) is transmitted to the first actuating element 44, the actuating element 44 is moved in the direction of brake cylinder 20. Control unit 14 actuates motor 12 based on the braking force exerted on the brake pedal by the driver. Motor 12 drives gear mechanism 16 to shift the second actuating element 46 along the longitudinal axis $A_L$ of actuator 18 towards brake cylinder 20. By the displacement of the actuator 18 in the direction of the brake cylinder 20, the braking force is increased and a braking pressure is generated at the wheel brakes via brake cylinder 20 (not shown).

Figure 10:
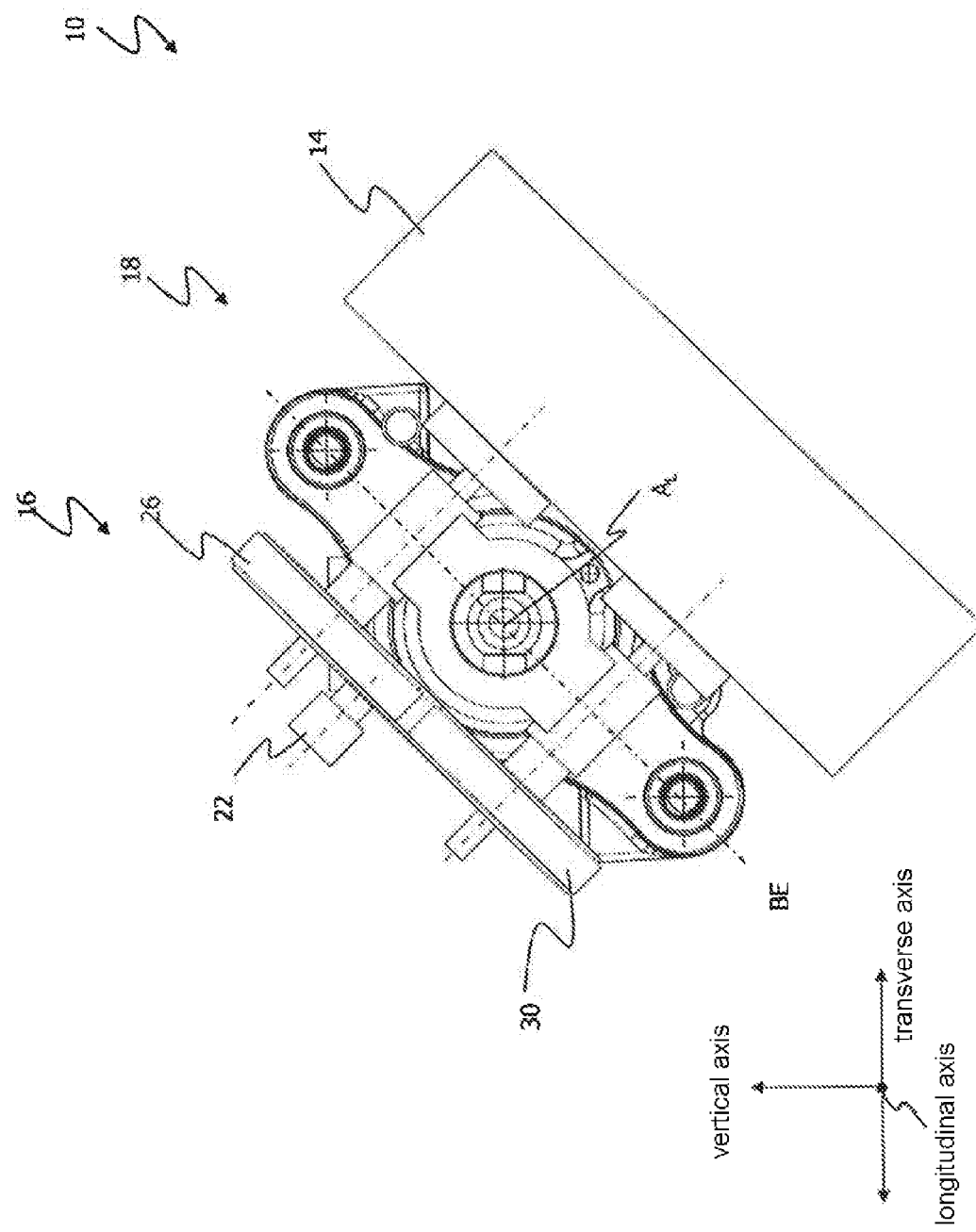
FIG. 10 is a perspective view of an electromechanical brake booster with a gear mechanism according to the first design variant.

FIG. 10 shows a front view of the brake booster 10 shown in FIGS. 8 and 9.

FIG. 10 particularly shows that all the gears of gear mechanism 16 are in line or in one plane, i.e. the spur gears 26, 30, the intermediate gear 28 and the pinion 24 are not offset relative to each other in the direction of the axis of rotation $A_1$ of the motor.

Figure 11:
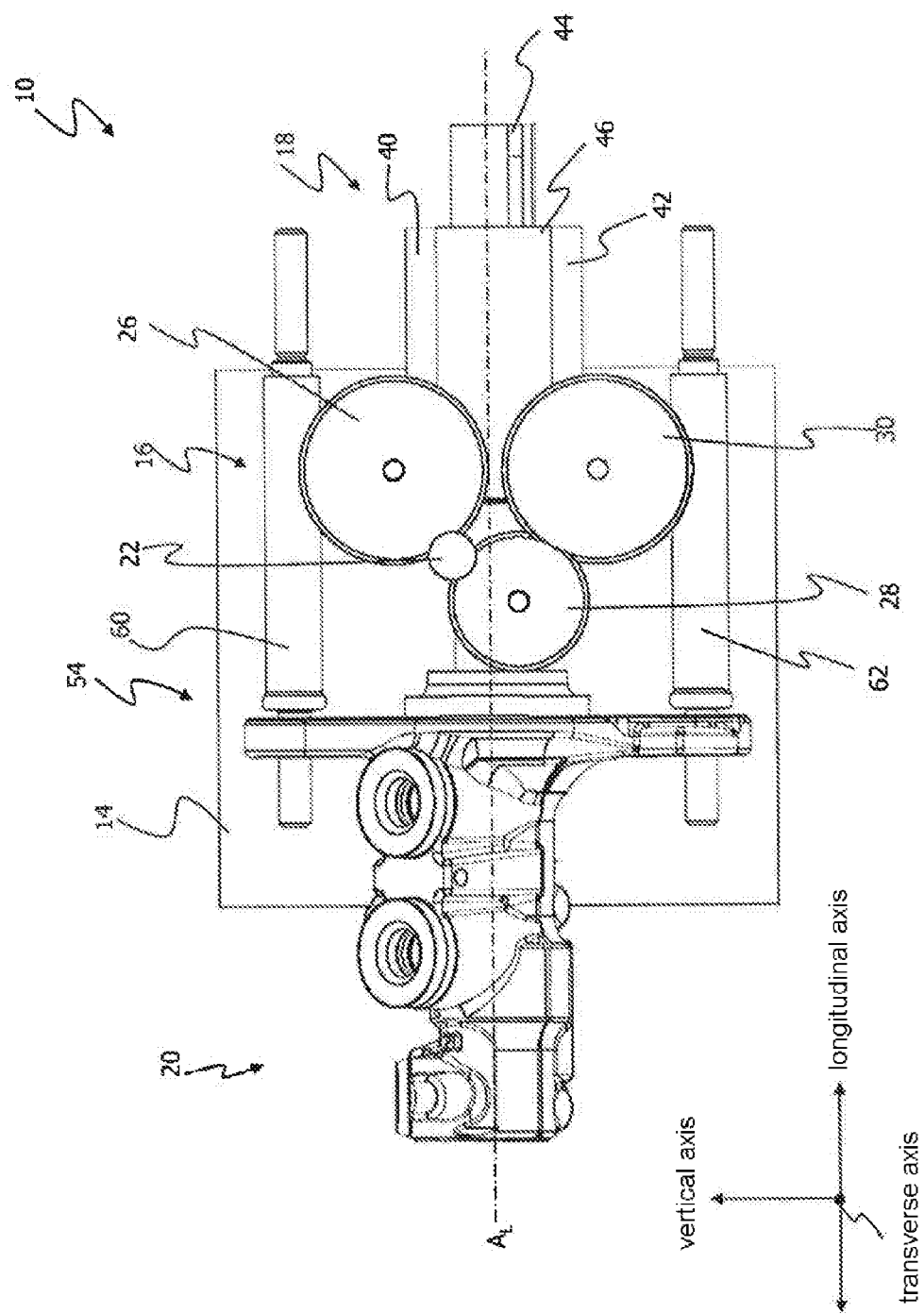
FIG. 11 is a perspective view of an electromechanical brake booster with a gear mechanism according to the first design variant.

FIG. 11 shows a side view of the electromechanical brake booster 10 shown in FIGS. 8 to 10.

In FIG. 11, toothed rack section 40 is disposed above the longitudinal axis $A_L$ of actuator 18 on the second actuating element 46. Toothed rack section 42 is provided below the longitudinal axis $A_L$ of actuator 18 on the second actuating element 46. In order to be able to displace actuator 18 in the direction of brake cylinder 20, first end plate 26 drives the top toothed rack section 40 and second end plate 30 drives the bottom toothed rack section 42. Actuator 18 is connected to brake cylinder 20, which adjoins actuator 18 in the direction of longitudinal axis $A_L$.

It is also evident from FIG. 11 that the first spur gear 26 is driven directly by motor output shaft 22, whereas intermediate gear 28 is arranged between pinion 24 and the second spur gear 30. The torque is transmitted from pinion 24 to the second spur gear 30 via intermediate gear 28.

Fastening means 54 is provided between brake cylinder 20 and actuator 18. Fastening means 54 includes mounting bolts 60, 62 which extend in the direction of the longitudinal axis of the vehicle and span the mounting plane BE.

Figure 12:
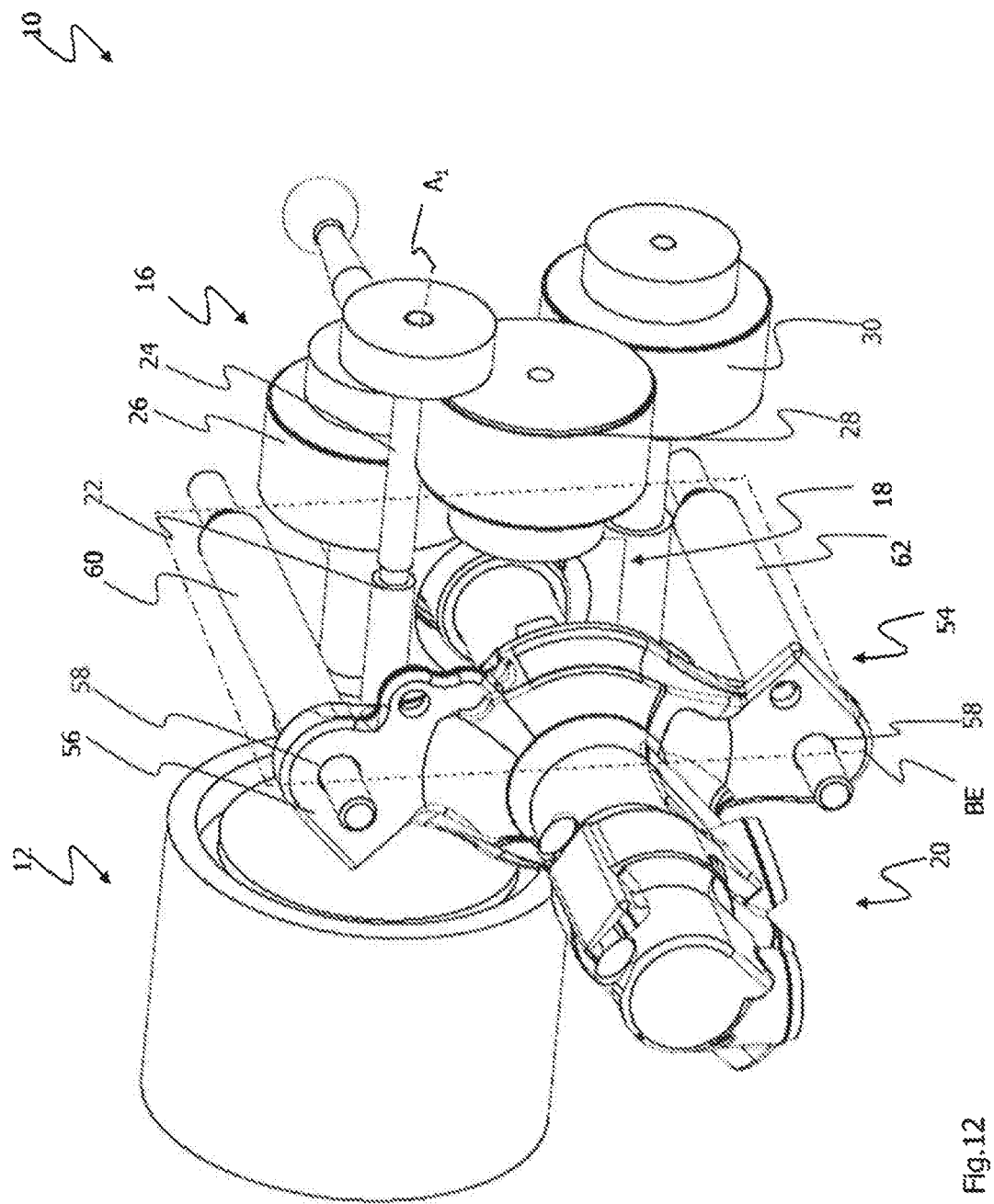
FIG. 12 is a perspective view of an electromechanical brake booster with a gear mechanism according to a second design variant.

FIG. 12 shows a perspective view of electromechanical brake booster 10 with a gear mechanism 16 according to a second design variant.

FIG. 12 shows that the first spur gear 26 and the second spur gear 30 lie in different planes. Intermediate gear 28 and first spur gear 26 are also offset from one another in the direction of the motor output shaft 22 and the axis of rotation $A_1$ of electric motor 12.

A pinion 24 is provided on motor output shaft 22 and is able to drive the first spur gear 26 and the intermediate gear 28, although the first spur gear 26 and the intermediate gear 28 are offset with respect to each other in the direction of the axis of rotation $A_1$. Pinion 24 is accordingly formed and dimensioned such that it spans the extension of the outer circumferential surfaces of the first spur gear 26 and the intermediate gear 28 in the direction of the axis of rotation $A_1$ of electric motor 12 and so is able to drive both the first spur gear 26 and the intermediate gear 28. Motor output shaft 22 extends from motor 12 to gear mechanism 16, which is arranged on the other side of actuator 18. Motor output shaft 22 passes through mounting plane BE.

Figure 13:
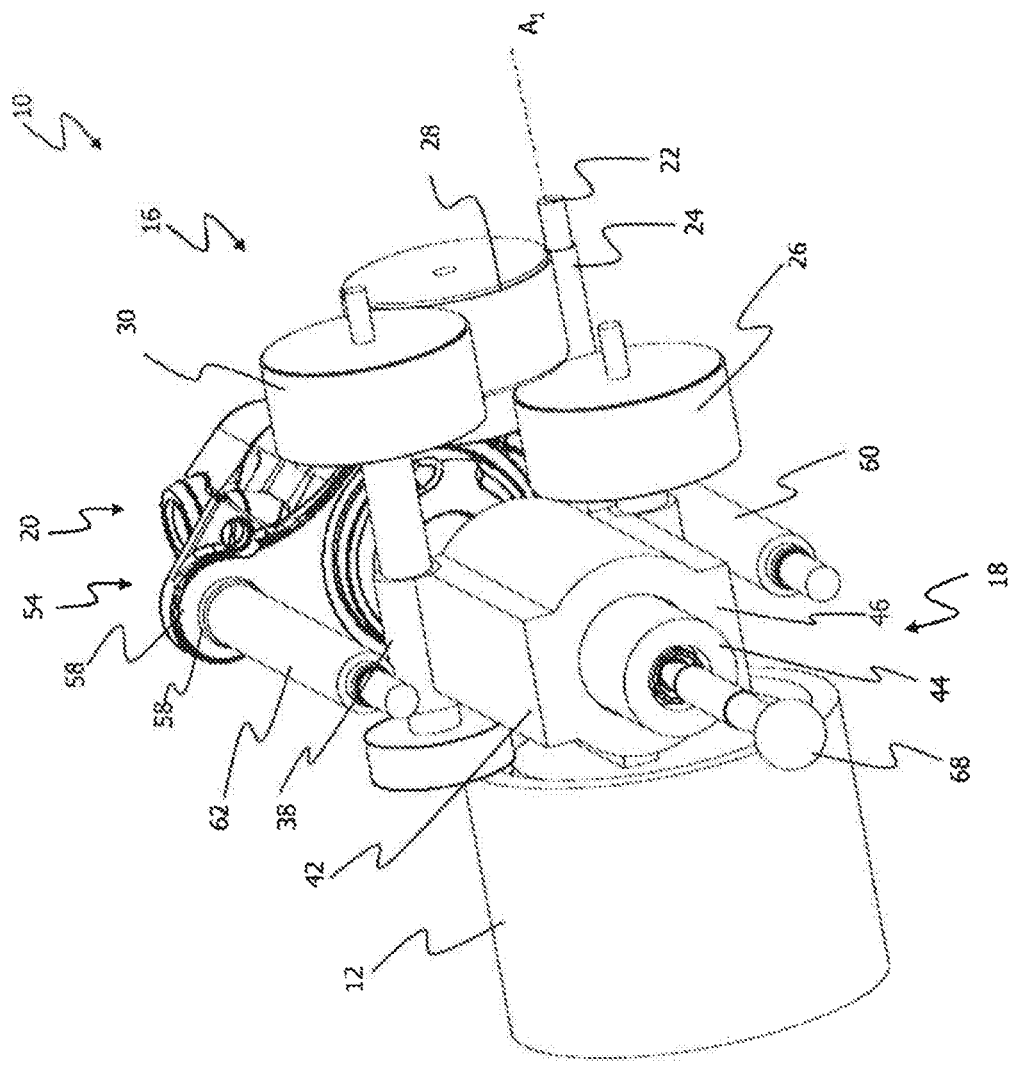
FIG. 13 is a perspective view of an electromechanical brake booster with a gear mechanism according to the second design variant.

FIG. 13 shows a further perspective view of the electromechanical brake booster 10 shown in FIG. 12.

Actuator 18 is connected to a force transmitting member 68, which transmits a braking force applied to a brake pedal to actuator 18. Force transmitting member 68 is coupled to the first actuating element 44.

Motor output shaft 22, or pinion 24 on the motor output shaft 22, drives the first spur gear 26 and the intermediate gear 28 directly and without interposed components. Intermediate gear 28 drives second spur gear 30. The direction of rotation of the second spur gear 30 may be reversed via the intermediate gear 28, so that the first spur gear 26 and the second spur gear 30 rotate in opposite directions.

The second spur gear 30 and the intermediate gear 28 are arranged in the same plane in the direction of the axis of rotation $A_1$. The first spur gear 26 is offset with respect to the intermediate gear 28 and the second spur gear 30 in the direction of the axis of rotation $A_1$ of electric motor 12. In other words, intermediate gear 28 and second spur gear 30 are arranged in a different plane from first spur gear 26.

Figure 14:
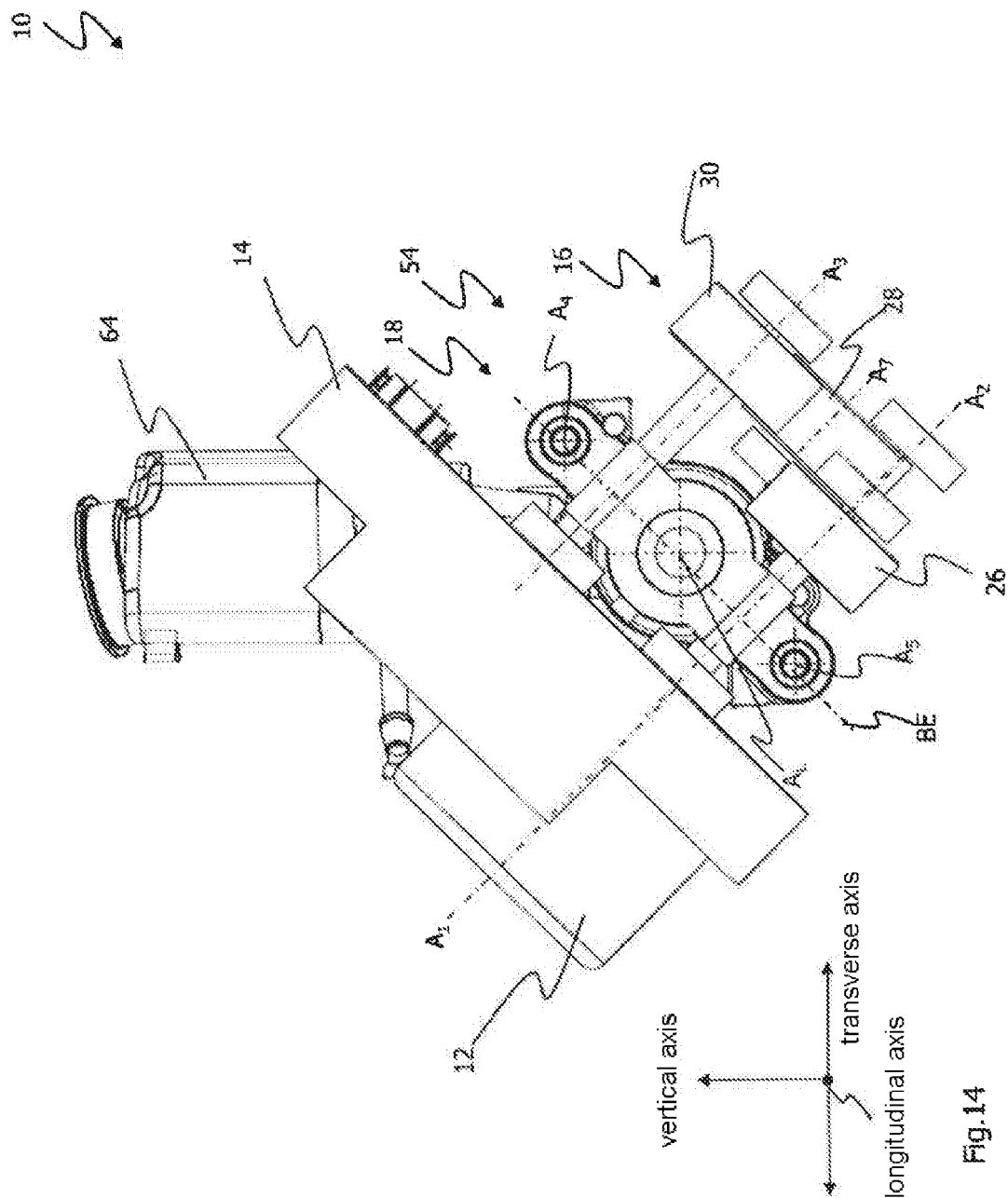
FIG. 14 is a perspective view of an electromechanical brake booster with a gear mechanism according to the second design variant.

FIG. 14 shows a front view of the electromechanical brake booster 10 shown in FIGS. 12 and 13.

The axis of rotation $A_1$ of electric motor 12 extends at a predetermined angle to the vertical axis of the vehicle. The axis of rotation $A_1$ of electric motor 12 extends perpendicularly to mounting plane BE. In the direction of the axis of rotation $A_1$ of electric motor 12, first spur gear 26 is offset from second spur gear 30 and intermediate gear 28. The axes of rotation $A_2$ of the first spur gear 26, $A_3$ of the second spur gear 30 and $A_6$ of the intermediate gear 28 extend parallel to each other but perpendicularly to mounting plane BE and obliquely to the vertical axis of the vehicle.

Figure 15:
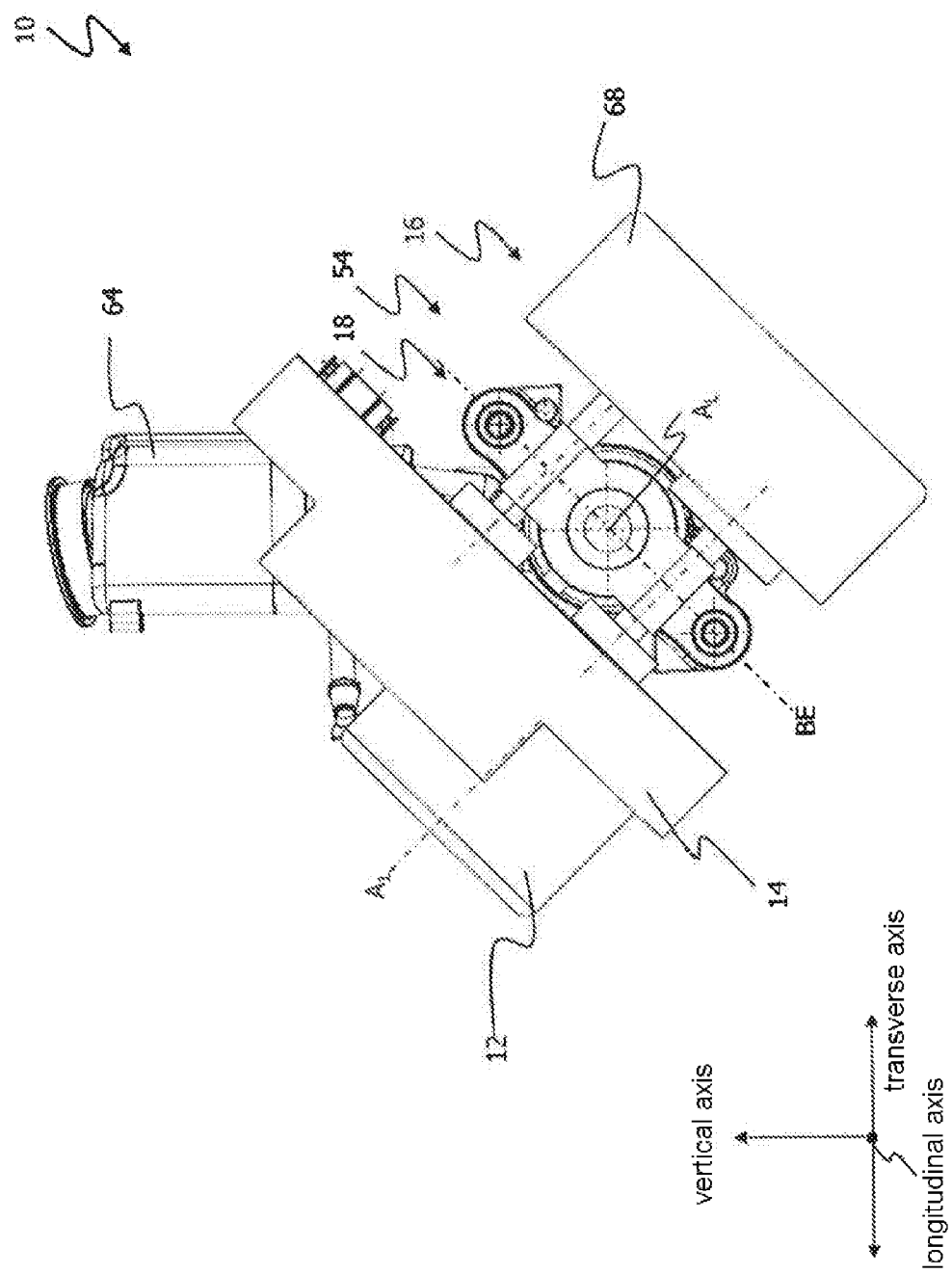
FIG. 15 is a perspective view of an electromechanical brake booster with a gear mechanism according to the second design variant.

FIG. 15 shows a view of an electromechanical brake booster 10, which is largely the same as the representation according to FIG. 14, but with the difference that gear mechanism 16 is embodied with a gear mechanism housing 68 for absorbing the bearing forces of the individual axes of rotation $A_2$, $A_3$, $A_6$.

Figure 16:
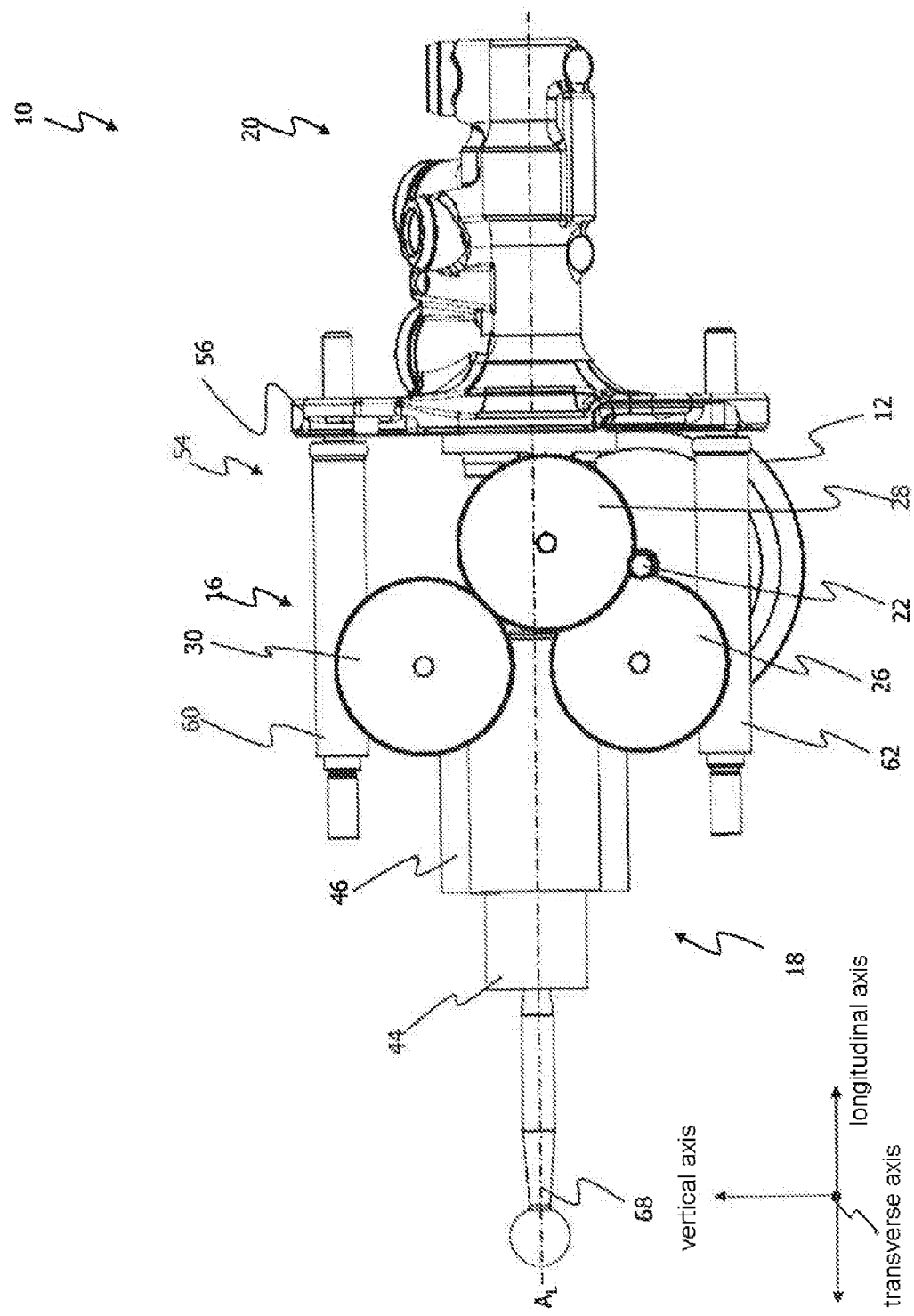
FIG. 16 is a perspective view of an electromechanical brake booster with a gear mechanism according to the second design variant.

FIG. 16 shows a side view of electromechanical brake booster 10.

FIG. 16 also shows clearly that the second spur gear 30 and the intermediate gear 28 are disposed in the same plane. The first spur gear 26 is offset with respect to the second spur gear 30 and the intermediate gear 28. In the direction of the transverse axis of the vehicle, intermediate gear 28 partially overlaps first spur gear 26. The motor output shaft 22 protrudes below the overlap region between the first spur gear 26 and the intermediate gear 28. The first spur gear 26 and the intermediate gear 28 are driven directly by motor output shaft 22 even when the first spur gear 26 and the intermediate gear 28 are offset with respect to each other.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An electromechanical brake booster for an electrohydraulic motor vehicle braking system, with a drive assembly for driving at least one actuator designed to actuate a brake cylinder, wherein the drive assembly has at least one electric motor and a gear mechanism for coupling the electric motor to the at least one actuator, wherein the gear mechanism has a first spur gear, an intermediate spur gear and a second spur gear, wherein a pinion of the electric motor directly drives both the first spur gear and the intermediate gear via engagement with both the first spur gear and the intermediate spur gear, and wherein the intermediate spur gear drives the second spur gear via engagement with both the pinion and the second spur gear;

wherein the first spur gear and the intermediate spur gear are arranged offset with respect to each other in the direction of an axis of rotation of the electric motor;

wherein the pinion is provided on the output shaft of the electric motor, which pinion is designed to drive the first spur gear and the intermediate spur gear, wherein the intermediate spur gear is offset with respect to the first spur gear in the direction of the axis of rotation of the electric motor; and wherein an extension of the pinion spans at least an axial extension of the outer peripheral surfaces of the first spur gear and the intermediate spur gear in the direction of the axis of rotation of the electric motor.

* * * * *